US006491587B1

United States Patent
Rich

(10) Patent No.: US 6,491,587 B1
(45) Date of Patent: Dec. 10, 2002

(54) SPINDLE COLLISION PROTECTION ADAPTOR

(76) Inventor: Donald S. Rich, c/o Intelle Pro, Inc. 190 Strykers Rd., Phillipsburg, NJ (US) 08865

( * ) Notice: Subject to any disclaimer, the term of this patent is extended or adjusted under 35 U.S.C. 154(b) by 0 days.

(21) Appl. No.: 09/793,159

(22) Filed: Feb. 27, 2001

Related U.S. Application Data

(60) Provisional application No. 60/198,100, filed on Apr. 18, 2000.

(51) Int. Cl.[7] .............................. F16D 9/00; F16D 3/48; B25G 3/18
(52) U.S. Cl. ...................... 464/33; 464/901; 464/137; 403/326
(58) Field of Search .................. 403/326, 329, 403/335, 333; 464/32, 104, 137, 901, 185, 33

(56) References Cited

U.S. PATENT DOCUMENTS

| | | | | | |
|---|---|---|---|---|---|
| 367,578 A | * | 8/1887 | Babb | .......................... | 403/326 |
| 559,924 A | * | 5/1896 | Arnold | ....................... | 403/326 |
| 2,610,879 A | * | 9/1952 | Pope | ........................... | 403/326 |
| 2,644,475 A | * | 7/1953 | Morton | ....................... | 403/326 |
| 4,012,155 A | * | 3/1977 | Morris | ........................ | 403/290 |
| 5,143,500 A | * | 9/1992 | Schuring et al. | ........... | 403/289 |

* cited by examiner

Primary Examiner—Lynne H. Browne
Assistant Examiner—Kenn Thompson
(74) Attorney, Agent, or Firm—Charles E. Temko

(57) ABSTRACT

A device for preventing damage to a driven spindle of a rotatably driven mechanism upon the occurrence of a radially-inwardly applied force wherein the spindle is disconnected without damage. The disclosed construction is particularly useful in conjunction with spindles of relatively smaller diameter.

3 Claims, 4 Drawing Sheets

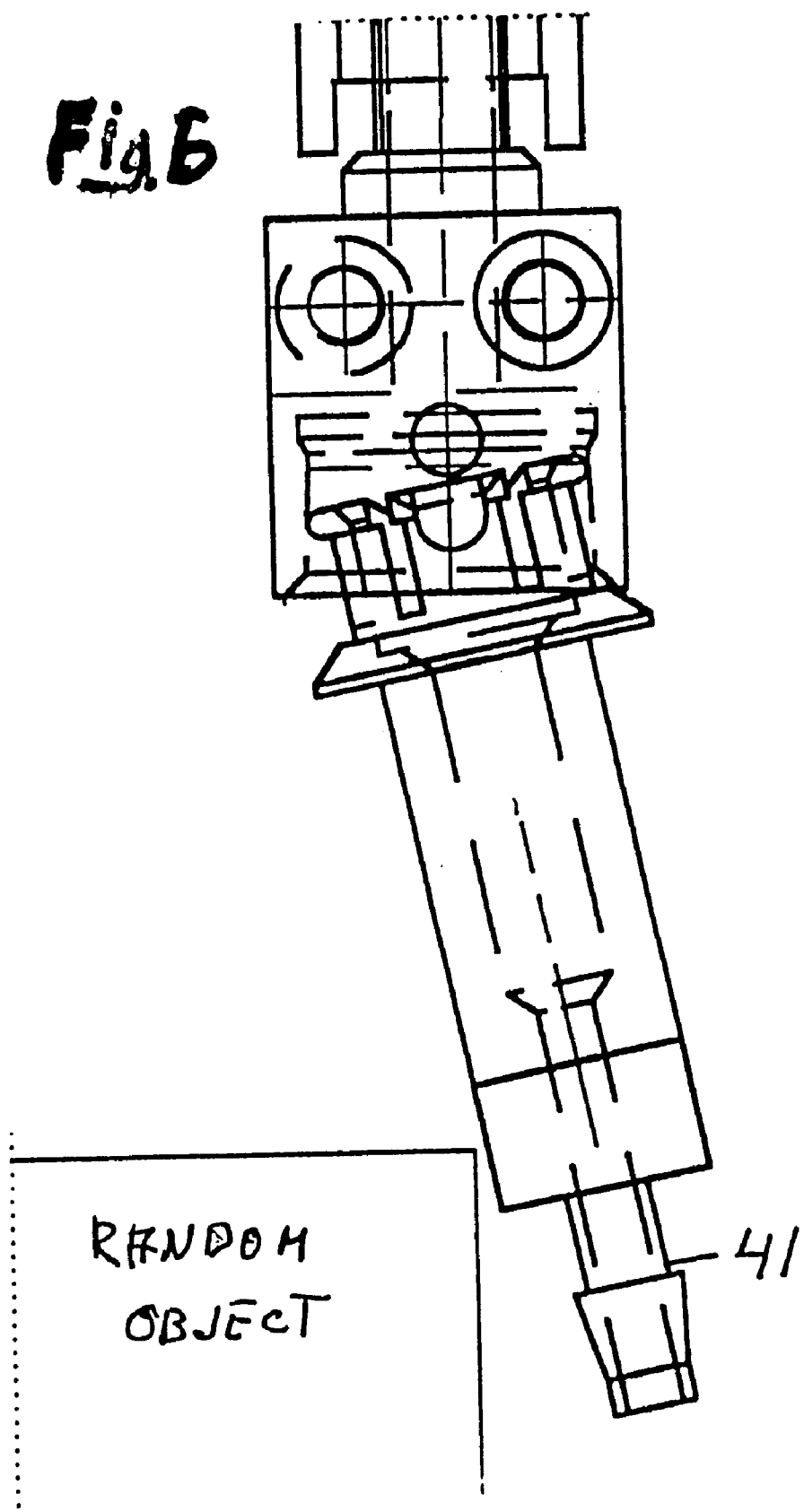

SPINDLE COLLISION PROTECTION ADAPTOR

This application claims the benefit of provisional application No. 60/198,100 filed on Apr. 18, 2000.

BACKGROUND OF THE INVENTION

This invention relates generally to the field of reciprocating driven spindle devices, and more particularly to an improved protective device for releasing a driven probe upon encountering a foreign object presenting a lateral force which might damage the spindle.

It is known in the art to provide so-called wrist protection devices for end of arm robotic tooling in the event of an inadvertent collision which deflects and possibly damages the spindle. Such devices are of relatively large diameter, and are not suitable where the probe diameter is relatively small, in the order of one quarter of an inch, as is employed in pick and place mechanisms, and the like.

SUMMARY OF THE INVENTION

Briefly stated, the invention contemplates the provision of an improved device of the class described which enables protection against damage of relatively small diameter driven spindles. To this end, the disclosed embodiment comprises a spindle adaptor element which connects to a driven shaft, and forms a resiliently-engageable socket cooperating with a probe element having an upper end forming a corresponding socket-engaging element. The device may include corresponding detent means for predetermined relative rotational positioning, as well as the transmission of torque through the engaged parts.

BRIEF DESCRIPTION OF THE DRAWINGS

In the drawings, to which reference will be made in he specification, similar reference characters have been employed to designate corresponding parts throughout the several views.

FIG. 6 is a schematic side elevational view showing the disconnection of the elements upon the occurrence of a radially-directed force against the probe element.

DETAILED DESCRIPTION OF THE DISCLOSED EMBODIMENT

Figure 1:
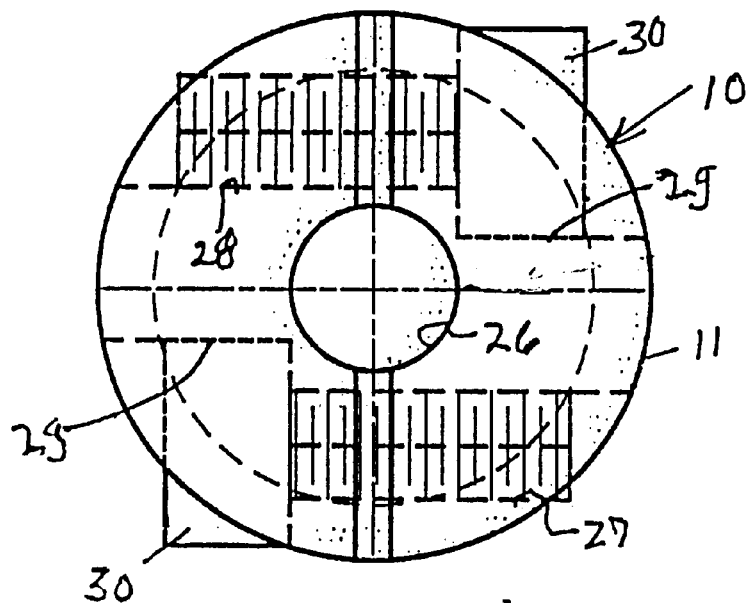
FIG. 1 is a schematic top plan view of a spindle adaptor element forming a part of the disclosed embodiment.
Figure 2:
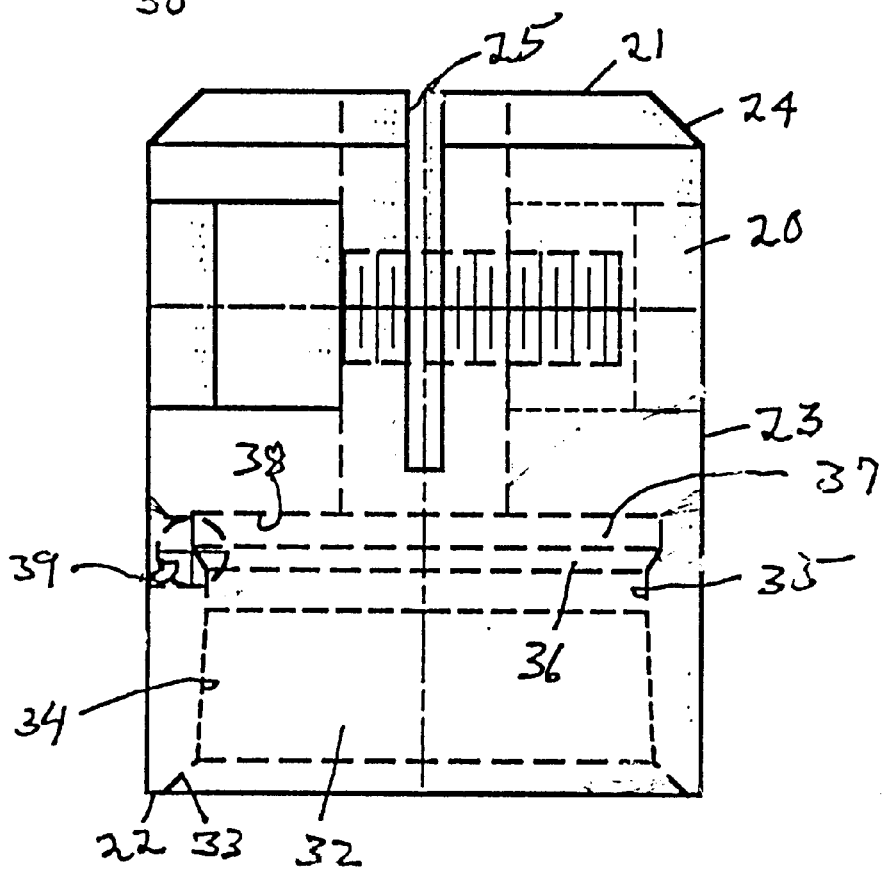
FIG. 2 is a schematic side elevational view thereof.

In accordance with the invention, the device, generally indicated by reference character 10 comprises a spindle adaptor element 11 and a detachably interconnected probe element 12.

The spindle adaptor element 11 is preferably machined from bar stock to form a body 20 bounded by an upper surface 21, a lower surface 22, a cylindrical side surface 23, and a chamfered surface 24. A longitudinally oriented slot 25 communicates with an axially disposed bore 26 for the transmission of vacuum pressure. First and second threaded bores 27 and 28 are aligned with coaxially unthreaded bores 29 for the reception of clamp screws 30 to the end of a reciprocating spindle 31 (FIG. 6). The body defines a machined recess 32 bounded by a frusto-conical surface 33, a tapered surface 34, a cylindrical surface 35, an outwardly tapered surface 36, a cylindrical surface 37, and an inner wall 38. A spherical recess 39 forms part of a ball detent 53 when the recess 32 is engaged.

Figure 3:
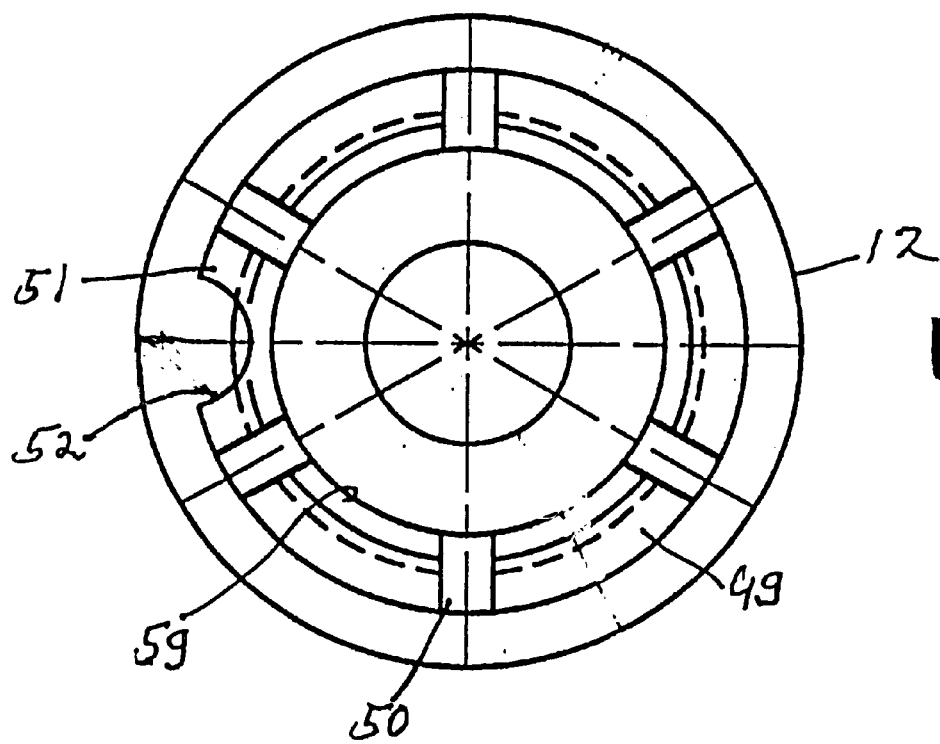
FIG. 3 is a schematic top plan view of a probe element.
Figure 4:
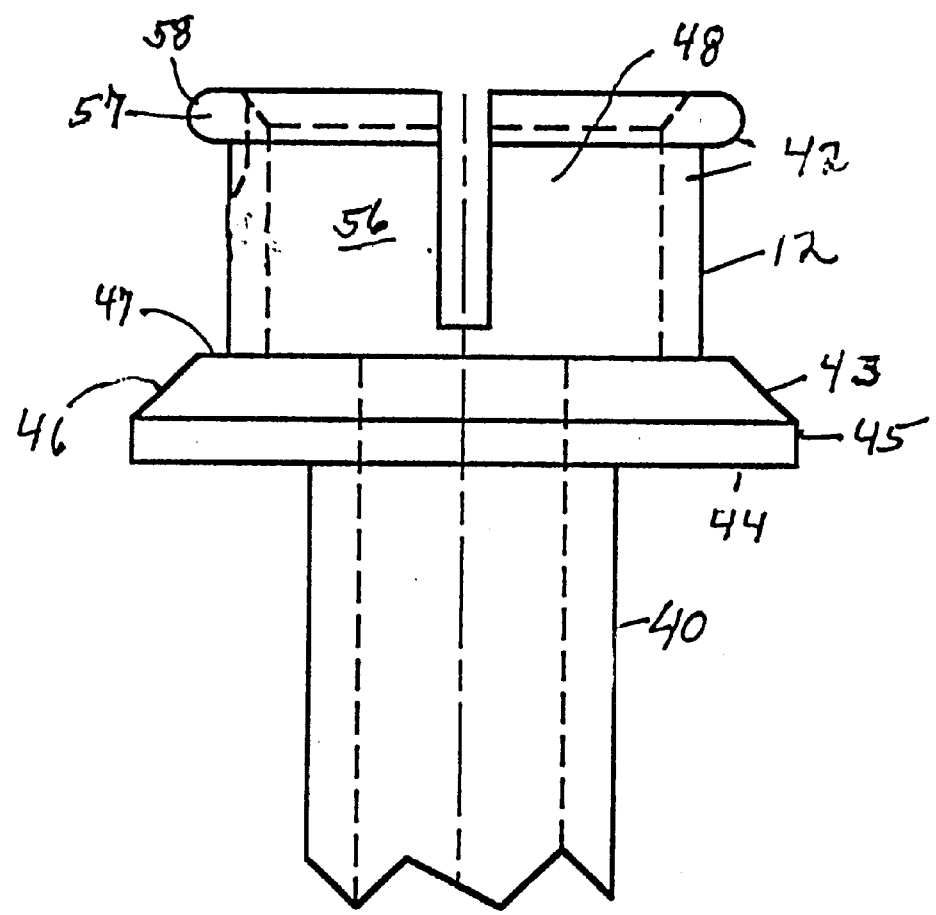
FIG. 4 is a schematic side elevational view thereof.

Referring to FIGS. 3 and 4, the probe element 12 is preferably also machined from bar stock, and includes an elongated shank 40 having a free end 41 (FIG. 6) forming a desired tool. An upper end 42 forms a plug selectively engaging the recess 32. It includes the lower flange 43 bounded by a lower surface 44, a cylindrical surface 45, a frusto-conical surface 46, and an upper surface 47 from which a castellated portion 48 extends. Member 48 supports six resilient members 49 separated by slots 50. One member 51 includes a recess 52 forming the other portion of the ball detent 53 which normally remains with the adaptor element when the components are in separated condition.

Each of the members 49 includes a vertical portion 56 having an upper end forming a radially-extending lateral flange 57, having a rounded outer surface 58 and a frusto-conical inner surface 59.

Figure 5:
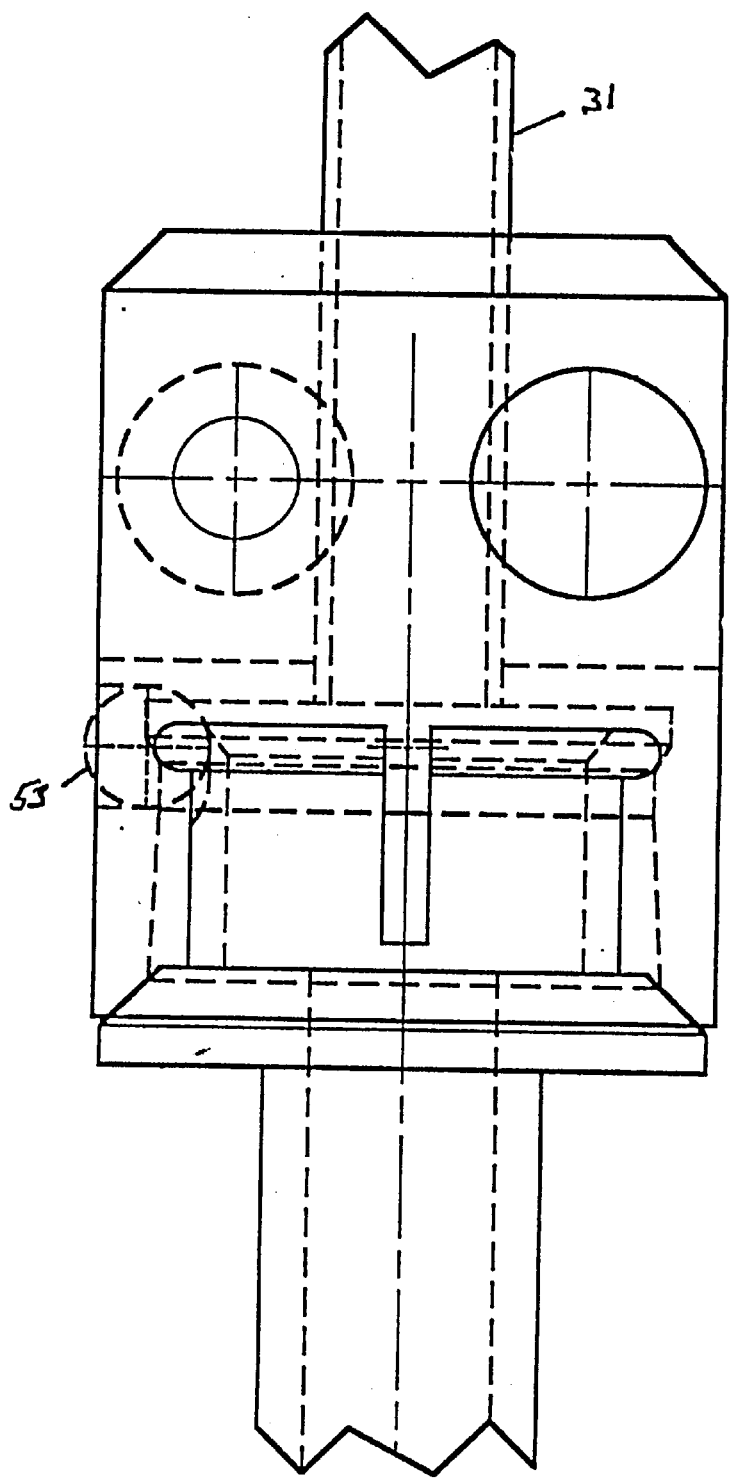
FIG. 5 is a schematic side elevational view showing the device in interconnected condition.

FIG. 5 shows the device in engaged condition, wherein the flanges of the castellated members are engaged at the inner end of the recess, and stability is obtained by the engagement of the frusto-conical surfaces adjacent the outer end of the socket.

FIG. 6 illustrates the disconnection of the elements upon engagement of a random object which exerts a lateral force, the same action occurring irrespective of the rotational position of the lateral force with respect to the ball detent. When the obstruction is removed, the parts may be again manually interconnected, and operation of the spindle device continued.

By providing a variety of probe elements 12, each with a different tool at the lower free end thereof, it is possible to rapidly interchange the probe elements for the performance of differing tasks.

I wish it to be understood that I do not consider the invention to be limited to the precise details in structure shown and set forth in the specification, for obvious modifications will occur to those skilled in the art to which the invention pertains.

I claim:

1. A spindle collision protection adaptor for use with a device having a reciprocating spindle supporting a tool, said adaptor comprising: a spindle adaptor element having means for engaging a free end of a spindle, and a detachably interconnected probe element; said spindle adaptor element including clamping means at an upper free end thereof and defining a recess extending from a lower surface thereof, said recess having a radially-extending cylindrical portion adjacent an inner end thereof; said probe element including a longitudinally-extending shank having an upper end, said upper end forming a plug selectively resiliently engaging said recess in said adaptor element, and detent means interconnecting said spindle adaptor element and said probe element for preventing relative axial rotation therebetween, whereby upon the occurrence of a radially extending force against said shank, said adaptor element executes laterally-extending movement to disengage said adaptor element from said probe element.

2. An adaptor in accordance with claim 1, said plug including a plurality of radially inwardly flexible castellated members having radially outwardly extending flanges engaging said cylindrical recess in said adaptor element.

3. An adaptor in accordance with claim 1, said adaptor element and said probe element each having communicating axially oriented bores for the transmission of fluid pressure therethrough.

* * * * *